United States Patent [19]
Kamioka et al.

[11] Patent Number: 5,990,577
[45] Date of Patent: Nov. 23, 1999

[54] HUB FOR LOCAL AREA NETWORK WITH BACKUP POWER SUPPLY SYSTEM

[75] Inventors: Hideo Kamioka, Chiba; Minoru Dendou, Kawasaki; Yoshimi Kohda, Yachiyo; Koji Kobayashi, Tokyo, all of Japan

[73] Assignee: Allied Telesis K. K., Japan

[21] Appl. No.: 09/047,150

[22] Filed: Mar. 24, 1998

Related U.S. Application Data

[63] Continuation-in-part of application No. 08/742,313, Nov. 1, 1996, abandoned.

[51] Int. Cl.$^6$ ....................................................... H02J 3/02
[52] U.S. Cl. .................................. 307/26; 307/46; 307/66
[58] Field of Search .................................. 307/43, 44, 64, 307/65, 66, 80, 85, 86, 87, 45, 46, 23, 25, 26

[56] References Cited

U.S. PATENT DOCUMENTS

| | | | |
|---|---|---|---|
| 3,766,403 | 10/1973 | Tsutsumi | 307/66 |
| 4,401,895 | 8/1983 | Petkovsek | 307/66 |
| 5,206,538 | 4/1993 | Orta | 307/66 |
| 5,247,205 | 9/1993 | Mototani et al. | 307/66 |
| 5,272,382 | 12/1993 | Heald et al. | 307/66 |
| 5,347,164 | 9/1994 | Yeh . | |
| 5,612,580 | 3/1997 | Janonis et al. | 307/64 |

*Primary Examiner*—Richard T. Elms
*Attorney, Agent, or Firm*—Barnes & Thornburg

[57] ABSTRACT

A hub for a local area network according to one embodiment of the present invention includes a plurality of communication ports connected to each of nodes in the network, through which a signal is transmitted among the nodes, a signal processing circuit having at least the functions of repeating the signal among the nodes and reshaping a waveform thereof, and a power supply circuit for supplying a dc current for driving the signal processing circuit. The power supply circuit further comprises an ac/dc converter for converting an ac current applied from an external ac power supply without passing through a power switch thereto into a predetermined dc current and supplying the dc current to a load circuit including the signal processing circuit without passing through a power switch, a backup secondary battery, a charging circuit for trickle charging the dc current output from the ac/dc converter into the backup secondary battery, and a control circuit for opening and closing a current path for supplying an output current of the backup secondary battery to the load circuit.

18 Claims, 4 Drawing Sheets

HUB FOR LOCAL AREA NETWORK WITH BACKUP POWER SUPPLY SYSTEM

This application is a continuation-in-part application of application Ser. No. 08/742,313 filed Nov. 1, 1996, for Hub for Local Area Network with Backup Power Supply System, now abandoned.

BACKGROUND OF THE INVENTION

1. Field of the Invention

The present invention generally relates to a hub for a local area network (hereinafter referred to as LAN), more specifically relates to a backup construction of a power supply for a hub for maintaining its function even when power failure due to such an accident as a defect in power supply wiring occurs.

2. Background Art

A typical LAN employs a transmission line of 10BASE standards. Among them, a transmission line according to 10BASE-T standard has been widely implemented these days since it is easier to wire and more flexible in moving or increasing a node in the network such as a personal computer (hereinafter referred to as PC). In a 10BASE-T LAN, an unshield twisted pair wire (hereinafter referred to as UTP), which is similar to an usual telephone line wire, is used as a transmission line. Connection of the UTP is easier than those in other 10BASE standards. Each of the wires extended from LAN boards installed in the nodes such as PCs is simply connected to a communication port of a hub. The hub is typically defined as a common wiring point for star-topology network and has a similar functions to those of a line concentrator.

The basic functions of a hub includes electrical isolation of the nodes such as PCs connected to the communication ports using a signal processing circuit, transmission of the signals communicated among the nodes, and reshaping a waveform of those signals. Such high performance hubs as an intelligent hub or a switching hub provide additional functions as a multi-layer connection using a plurality of hubs and connection with a backbone.

The above-mentioned hubs usually operate with a commercial ac power supply. The supplied ac current is converted into a stabilized dc current by a power circuit such as an ac/dc converter provided in the hub to drive the load circuit including a signal processing circuit. An ordinary hub is not equipped with a power switch, therefore, the hub becomes operative when connected to an ac power supply. As a result, once connected to an ac power supply, the hub is continuously powered thereby. In general, the hub does not require frequent maintenance and access after installation. Thus, the hub is sometimes disposed below a floor panel with the wiring.

A computer system responsible for an important information processing usually employs a backup power supply system so that abrupt power failure does not affect the system. In a small-scale system, an uninterruptible power supply, hereinafter referred to as UPS, is usually provided with each of the equipments in a network such as PCs and hubs. The UPS is an apparatus connected to a commercial ac power supply so as to provide an ac current inverted from an output dc current of a built-in backup battery.

However, there are some shortcomings with employment of the UPS. One is that the UPS is large in size. Another is that the UPS is expensive. Due to these problems, the following disadvantages arise: significant increase in cost of a power supply facility; difficulty in determining appropriate arrangement of the UPS in a system and capacity thereof; awkwardness in wiring of the power supply cables; and necessity for a large space for installation of the UPS.

In view of the above problems, the present applicant has reached a basic concept of a hub provided with a built-in a backup function of a power supply. More specifically, like a notebook-sized PC, a backup secondary battery is equipped with the hub, which is trickle charged with a supplied ac current via a charging circuit and provides a dc output current for driving the load circuit when an ac power supply fails. The conventional apparatus such as a notebook-sized PC having a backup secondary battery has a manual power switch. While the manual power switch is opened, operation of the apparatus and discharging of the secondary battery are prevented except a small amount of self discharge of the battery.

However, since the hub does not have a power switch as previously mentioned, a conventional backup power supply circuit using a secondary battery has the following problem when applied to the hub.

The hub without a power switch is in operation continuously by a fully charged backup secondary battery since it is shipped. Therefore, the backup secondary battery installed during an assembling process is exhausted after several days depending on a capacity of the backup battery. Because of this problem, a user of the hub is required to charge the exhausted secondary battery so as to activate a backup power supply function before starting to use the hub, although the backup power supply function of the hub should become effective immediately after it is connected to a network system.

SUMMARY OF THE INVENTION

One object of the present invention is to provide a hub equipped with a backup power supply function using a secondary battery which becomes activated immediately after the hub is connected to a network system such as a LAN.

Another object of the present invention is to provide a hub which is able to avoid breakdown of a whole network system in case of power failure or a defect caused in a power supply wiring without using an expensive uninterruptible power supply facility.

Yet another object of the present invention is to provide a hub which enables avoiding unnecessary discharge and resultant exhaustion of a fully charged backup battery installed therein since shipment till a user put it in use.

Further object of the present invention is to provide a hub, which has a function of reporting a backup state thereof to a network management terminal in a network and to users by a buzzer.

Another object of the present invention is to provide a hub, which has a function of detecting and indicating whether the backup secondary battery is installed in the power supply circuit. The detected battery condition may be transmitted via the network to other nodes therein.

According to one aspect of the present invention, a hub for a local area network includes a plurality of communication ports connected to each of nodes in the network, through which a signal is transmitted among the nodes, a signal processing circuit having at least the functions of repeating the signal transmitted among the nodes and reshaping a waveform thereof, and a power supply circuit for supplying a dc current for driving the signal processing circuit. The power supply circuit comprises an ac/dc converter for converting an ac current applied from an external ac power supply without passing through a power switch thereto into a predetermined dc current and supplying the dc current to a load circuit including the signal processing circuit without passing through a power switch, a backup secondary battery, a charging circuit for trickle-charging the backup secondary battery by the dc current output from the ac/dc converter, and a switching circuit for opening and closing a current path for supplying an output current of the backup secondary battery to the load circuit. The switching circuit includes a switching device inserted in the current path from the backup secondary battery and a control circuit for an on-off control of the switching device. The control circuit includes a manual switch for turning on the switching device in case that the charging circuit provides an effective output current, whereby the switching device is held at an on state by an output current of the backup secondary battery.

A hub according to another aspect of the present invention comprises a switching circuit including a switching device inserted in the current path from the backup secondary battery and a control circuit for an on-off control of the switching device, the control circuit turning on the switching device on receiving a link effective signal from the signal processing circuit when the communication port is connected to an active node that communication can be established therebetween, whereby the switching device is held at an on state by an output current of the backup secondary battery.

A hub according to further aspect of the present invention may include a charging control circuit for connecting the backup secondary battery with the charging circuit when the ac/dc converter outputs the predetermined dc current and the backup secondary battery is installed in the power supply circuit, a battery condition indicating circuit for outputting a battery condition signal indicating that the backup secondary battery is installed in the power supply circuit to provide a predetermined dc current when the ac/dc converter outputs a predetermined dc current by the ac power supplied to the ac/dc converter.

Other features and advantages of the present invention will become apparent in light of the following detailed description of the best mode to carry out the invention and in the accompanying drawings.

DESCRIPTION OF PREFERRED
EMBODIMENTS

Figure 1:
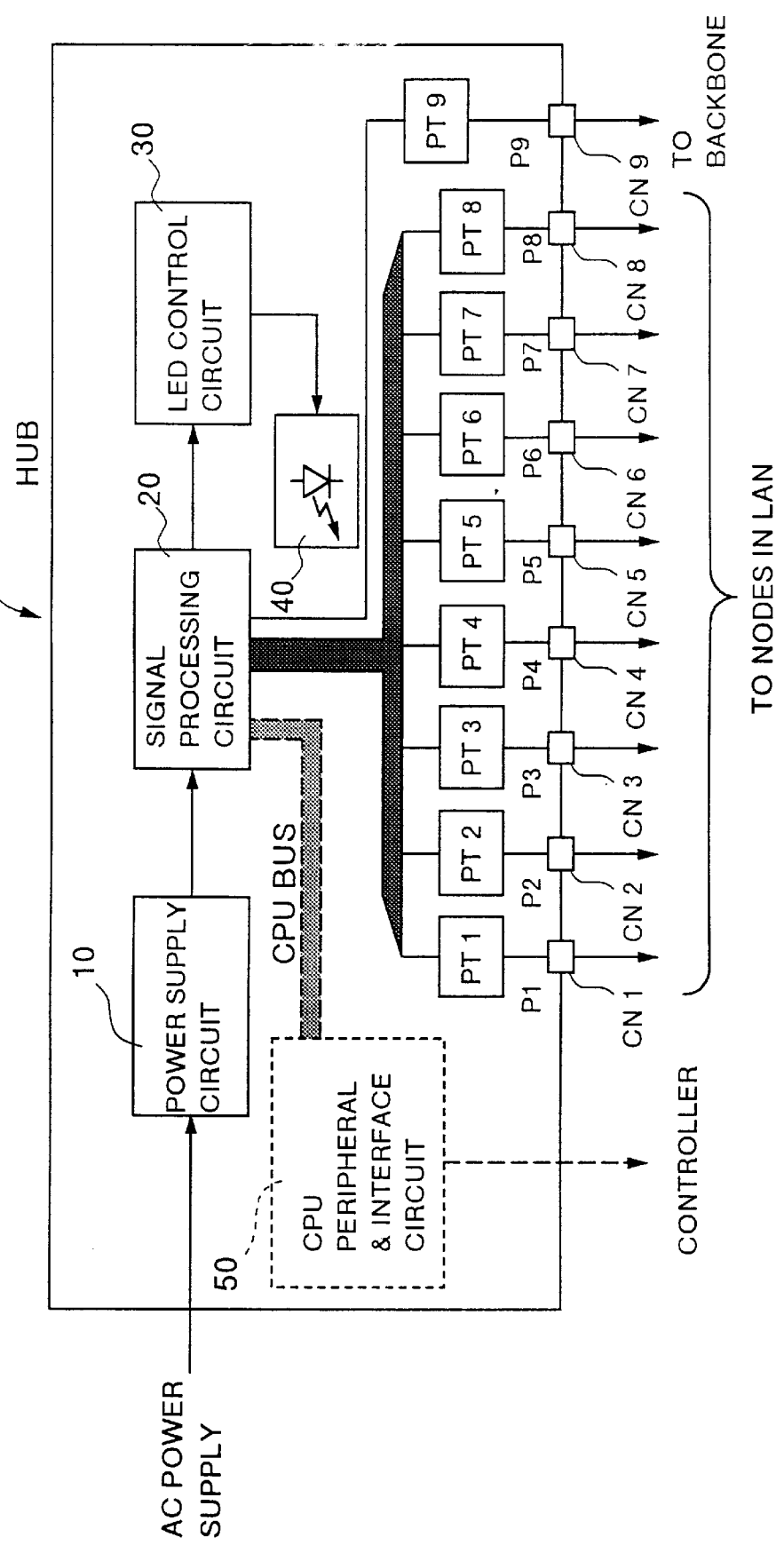
FIG. 1 is a schematic block diagram of a hub containing a typical configuration for a LAN according to a 10BASE-T standard.

As shown in FIG. 1, a hub 1 employed for a LAN according to a 10 BASE-T standard comprises a power supply circuit 10, a signal processing circuit 20, an LED control circuit 30, an LED indicator unit 40, a plurality of communication ports P1 to P9, each of which including a pulse transformer PT1 to PT9 and a connector CN1 to CN9. The power supply circuit 10 is connected with an external ac power supply and provides a rectified and stabilized dc power to the other circuits in the hub 1. The power supply circuit 10 also includes a backup power supply circuit according to the present invention, which will be described later in detail. The signal processing circuit 20 performs primary functions of repeating the transmitted signal among the nodes in the network and reshaping the waveform of the same. The signal processing circuit 20 may consist of Advanced Micro Devices, Am79C981 repeater chip. The LED control circuit 30 controls turning on and off of LEDs in the LED indicator unit 40 in response to monitoring signals of each of the communication ports input from the signal processing circuit 20. The LED indicator unit 40 contains the LEDs corresponding to the respective communication ports P1 to P9 so as to indicate an operating state of each port. Each of the communication ports P1 to P8 having a connector CN1 to CN8 is connected to the signal processing circuit 20 via a pulse transformer PT1 to PT8. Type RJ45 connectors according to a 10BASE-T standard are employed as the connectors CN1 to CN8. On the other hand, the communication port P9 is for an Attachment Unit Interface, AUI, to be connected to a backbone of the network. Each of the pulse transformers PT1 to PT9 transmits the signal to the signal processing circuit 20 while isolating each of the connected nodes electrically. A CPU, peripheral and interface circuit 50 is optionally equipped with the hub 1 to constitute an intelligent hub which is able to manage the network.

Figure 2:
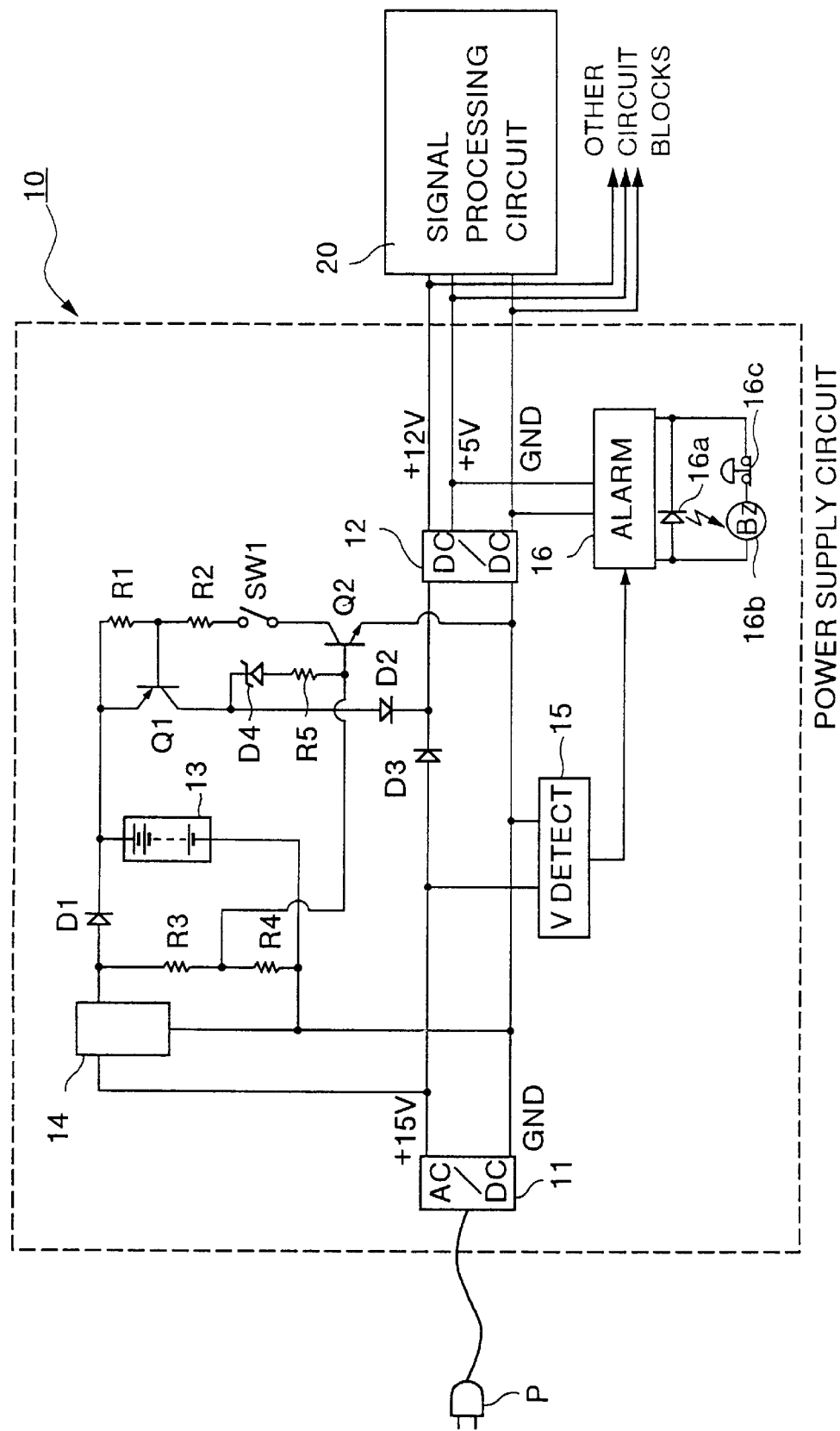
FIG. 2 is a schematic diagram of a power supply circuit for a hub according to one embodiment of the present invention.

FIG. 2 shows a schematic circuit diagram of a power supply circuit of the hub shown in FIG. 1, according to one embodiment of the present invention. When an electric plug P is connected to a socket of a commercial ac power supply, an ac current is directly supplied to an ac/dc converter 11 and converted into +15V dc power. The dc output of the ac/dc converter 11 is directly introduced to a dc/dc converter 12 to be converted into a highly stabilized +12V and +5V dc power. The +12V and +5V dc outputs of the dc/dc converter 12 are supplied to the signal processing circuit 20 and other circuit blocks in the hub 1.

In the power supply circuit 10, a lead acid battery is typically employed as a backup secondary battery 13. A charging circuit 14 for trickle-charging the secondary battery 13 is connected to the +15V output terminal of the ac/dc converter 11. If the secondary battery 13 is almost fully charged, a very small charging current for compensating a self discharging of the secondary battery 13 flows through a diode D1. Alternatively, if the secondary battery 13 is not completely charged, a relatively larger charging current is supplied to the secondary battery 13. Though not shown in the figures, this charging condition is preferably indicated by an LED indicator, for example, a red LED, which is turned on by a signal from the charging circuit 14.

A (+) output terminal of the secondary battery 13 is connected to an input terminal of a dc/dc converter 12 via a series circuit of a power transistor Q1 and a diode D2. The +15V output terminal of The ac/dc converter 11 is also connected to the input terminal of the dc/dc converter 12 via a diode D3. In the condition that the secondary battery 13 is fully charged, the power transistor Q1 has been turned on, and the ac/dc converter 11 does not provide an effective output, a discharging current from the secondary battery 13 is supplied to the dc/dc converter 12 through the power transistor Q1 and the diode D2. The signal processing circuit 20 and other circuits in the hub 1 are driven by the output current of the secondary battery 13 in this backup situation.

A control circuit including resistors R1 and R2, a manual switch SW1, and a control transistor Q2 is connected to a base of the power transistor Q2. When both the manual switch SW1 and the control transistor Q2 are turned on, a base current of the power transistor by appears to turn on the same. At this moment, a backup condition is established.

When the external ac input is supplied and the charging circuit 14 normally operates by the output of the ac/dc converter 11, the charging circuit 14 outputs a predetermined voltage. In this situation, a part of an output current of the charging circuit 14 flows through a series circuit of resisters R3 and R4. A current at a middle point of the resistors R3 and R4 is applied to a base of the control transistor Q2 to turn on the same. Therefore, the control transistor Q2 is turned on when the external ac power is normally applied to the power supply circuit 10.

In a backup ready mode in that the power transistor Q1 is turned on and the external ac power is supplied to the power supply circuit 10, the condition is also preferably indicated by an LED indicator, for example, a green LED (not shown). The green LED may be turned off while the red LED is on, which indicates a charging mode as described above.

In the above backup ready mode, an output voltage of the secondary battery 13 is applied to a collector of the power transistor Q1 when the battery 13 is sufficiently charged to turn on the power transistor Q1. A base current of the control transistor Q2 is supplied by the output voltage of the battery 13 via a series circuit of a zener diode D4 and a resister R5 inserted between the collector of the power transistor Q1 and the base of the control transistor Q2. An on-state of the control transistor Q2 and the power transistor Q1 is held by the above self-hold current path.

If the output voltage of the secondary battery 13 is not lower than the predetermined level, the power transistor Q1 is self-held to be turned on even when the base current of the control transistor Q2 is not supplied through the resister R3 from the charging circuit 14. Therefore, when the external ac power is not normally supplied to the power supply circuit 10 due to such accidents as disconnection of the electric plug P from a socket or an external power failure, the discharging current of the battery 13 is supplied to the dc/dc converter 12 through the power transistor Q1 which is self-held and the diode D2. When the output voltage of the battery 13 is decreased beyond the predetermined level, the current through the zener diode D4 and the resister R5 disappears. Then, the control transistor Q2 and the power transistor Q1 become turned off to prevent an excessive discharge of the battery 13. When a terminal voltage of the battery 13 recovers to the predetermined value since a load is removed by turning off of the transistor Q1, the transistor Q1 does not turn on until the ac power is reinstated and the transistor Q2 turns on. Accordingly, the battery 13 is prevented from overdischarge due to repeated connections to and disconnections from the load circuit in the vicinity of the predetermined voltage level.

During a backup period, the backup operation can be aborted by opening the switch SW1 at any time. Therefore, when a whole network is safely shut down, the backup operation may be stopped before the battery 13 is exhausted. In this aspect, the switch SW1 functions as a main switch for backup operation.

A voltage detecting circuit 15 is connected to the output lines of the ac/dc converter 11 for monitoring the +15V dc output of the ac/dc converter 11 to determine if the predetermined output voltage is obtained. To the +5V output lines of the dc/dc converter 12 is connected an alarm circuit 16.

The alarm circuit 16 is operative for the effective +5V output of the dc/dc converter 12. When the dc/dc converter 12 provides a normal +5V output and the voltage detecting circuit 15 indicates that no effective output is provided by the ac/dc converter 11, the alarm circuit 16 determines that a backup state by the battery 13 has been established and turns on and off an LED indicator 16a and sound a buzzer 16b intermittently. Users of the hub 1 are notified that an external ac power for the hub 1 has failed and the hub 1 is operated by the backup secondary battery 13 in the power supply circuit 10. The buzzer 16b is able to be stopped by turning off the cancel switch 16c for avoiding further consumption of the battery 13 and stopping noisy sound.

Figure 3:
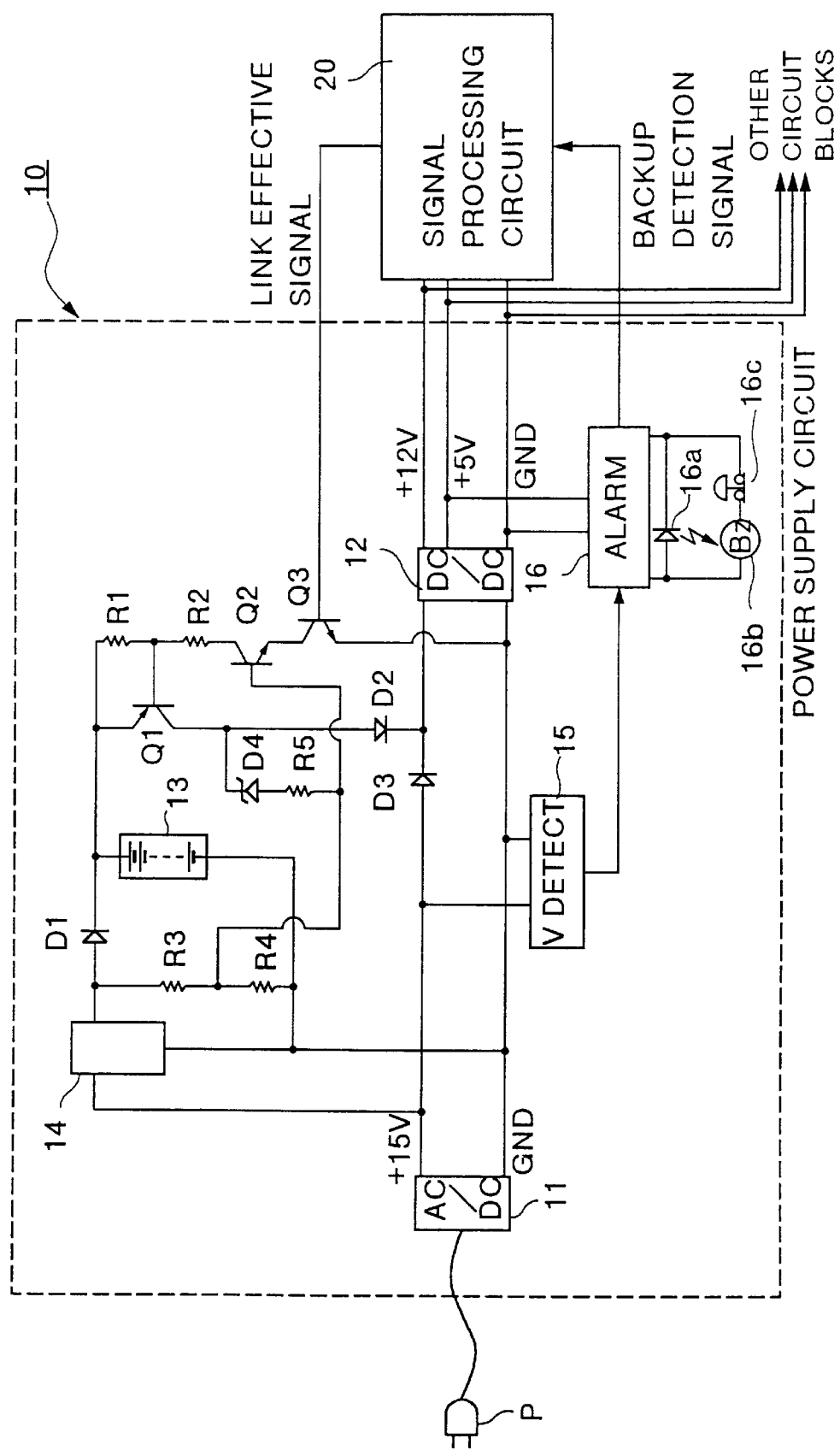
FIG. 3 is a schematic diagram of a power supply circuit for a hub according to another embodiment of the present invention.

FIG. 3 shows a schematic circuit diagram of a power supply circuit according to another embodiment of the present invention. In this embodiment, the signal processing circuit 20 further contains a monitoring circuit (not shown). The monitoring circuit continuously determines whether wires from the nodes are normally connected to the communication ports and whether signal transmission with a transceiver in each of the nodes via the wires is established. As shown in FIG. 3, a link effective signal is output from the signal processing circuit 20 corresponding to a communication port connected with an active node, which is ready to communicate with. The link effective signal also turns on an LED in the LED indicator unit 40 via the LED control circuit 30 for indicating a link effective state of the corresponding communication port. In the signal processing circuit 20 shown in FIG. 3, a link effective signal OK is output when a link effective signal is provided with for at least one communication port.

A control transistor Q3 is connected to the control transistor Q2 in series in the control circuit for the power transistor Q1 in FIG. 3, instead of the manual switch SW1 in FIG. 2. A base of the control transistor Q3 is connected to the signal processing circuit 20. Therefore, when the link effective signal OK is applied to the base of the control transistor Q3, the transistor Q3 turns on. In other words, when the charging circuit 14 outputs a normal voltage and the link effective signal OK is supplied to the transistor Q3, the power transistor Q1 turns on to enable a backup function by the backup battery 13.

In FIG. 3, a backup detection signal is supplied to the signal processing circuit 20 by the alarm circuit 16 when the alarm circuit 16 determines a backup state by the backup battery 13. In case that the power supply circuit 10 of the present embodiment is applied to the intelligent hub 1 including the CPU, peripheral and interface circuit 50, the backup detection signal is transmitted to a predetermined node as a network management terminal via the corresponding communication port. This signal transmission is controlled by the CPU, peripheral and interface circuit 50 to notify the network management terminal of the backup state of the hub 1.

Figure 4:
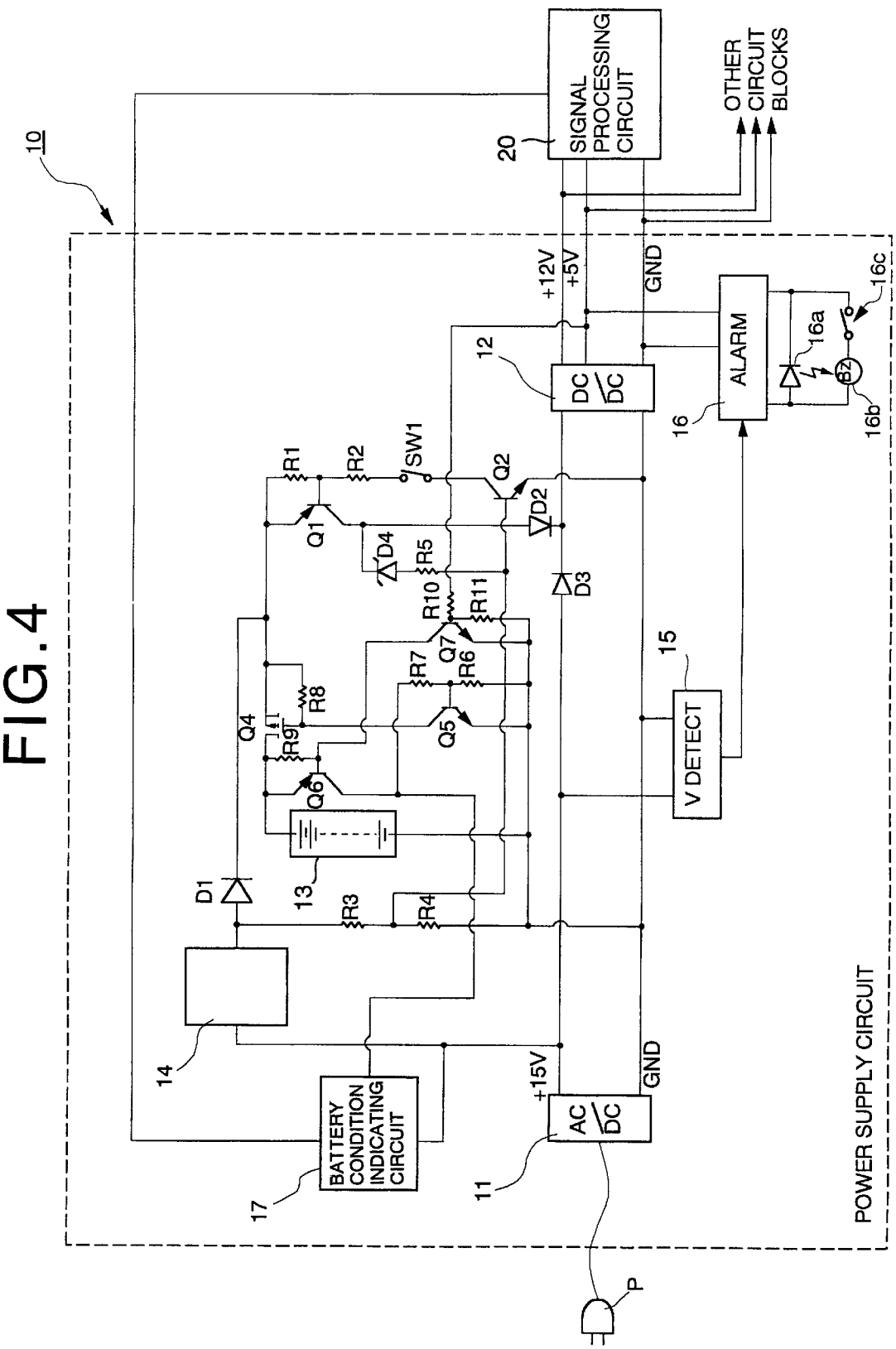
FIG. 4 is a schematic diagram of a power supply circuit for a hub according to yet another embodiment of the present invention.

Another embodiment of the present invention is shown in FIG. 4. A power supply circuit 10 in this embodiment has a battery condition indicating circuit 17 in addition to the circuit of the first embodiment in FIG. 2. This indicating circuit 17 outputs a signal when the ac/dc converter 11 provides a dc output and the backup secondary battery is properly installed in the power supply circuit 10 to confirm the backup secondary battery is installed and connected to the power supply circuit 10. Namely, the battery condition indicating circuit 17 outputs a signal when the circuit 17 is supplied with a +15V dc output from the ac/dc converter 11 and a predetermined dc output current from the backup secondary battery 13. A detecting circuit of both a +5V dc output from the dc/dc converter 12 and the output current from the backup secondary battery 13 includes a field effect transistor Q4, hereinafter referred to as an FET Q4, and transistors Q5 to Q7. A drain and a source of the FET Q4 are connected to a positive terminal of the battery 13 and a corrector of the transistor Q1 respectively. A gate of the FET Q4 is connected to a collector of the transistor Q5, and to the collector of the transistor Q1 via a resistor R8. An emitter of the transistor Q5 is connected to the ground line. A base of the transistor Q5 is connected to the ground line via a resistor R6, and to a emitter of the transistor Q6 through a resistor R7. The emitter of the transistor Q6 is also connected to an input terminal of the battery condition indicating circuit 17. A collector of the transistor Q5 is connected to the positive terminal of the battery 13, and to a base of itself via a resistor R9. The base of the transistor Q5 is connected with a collector of the transistor Q7. An emitter of the transistor Q7 is connected to the ground line, and to a base of itself via a resistor R11. The base of the transistor Q7 is connected to the +5V dc output of the dc/dc converter 12 via a resistor R10.

When an ac input is applied to the power supply circuit 10 and the dc/dc converter 12 outputs a +5V dc voltage, the transistor Q7 turns on through the resistor R10 to subsequently turn on the transistors Q6 and Q5, and then the FET Q4. At this time, the battery 13 is conductive with the charging circuit 14 through the diode D1 and with the dc/dc converter 12 via the transistor Q1 and the diode D2. If the battery 13 is installed in the power supply circuit 10 with sufficiently charged, the battery condition indicating circuit 17 is supplied with a dc current from the battery 13 via the transistor Q6. In this case, since the indicating circuit 17 also receives a dc input from the ac/dc converter 11, the battery condition indicating circuit 17 provides a "BATTERY OK" signal to the signal processing circuit 20. The "BATTERY OK" signal informs the signal processing circuit 20 that the backup secondary battery 13 is in an operative condition.

When the battery 13 is not installed in the power supply circuit 10, Q6 cannot be turned on due to absence of a dc current from the battery 13, thus the transistor Q5 and the FET Q4 remain turned off. This results that the transistor Q6 is in an off state until the battery 13 is installed in because the charging circuit 14 is disconnected from the transistor Q6 by the turned-off FET Q4. The signal processing circuit 20 may transmit a battery condition signal to computers such as servers through a network based on the "BATTERY OK" signal. The "BATTERY OK" signal may cause to generate various sensible signals such as light and sound so as to inform that the battery 13 is not properly installed.

In order to detect whether the battery 13 is installed, the charging circuit 14 must be disconnectable from the battery 13. Therefore, a bidirectional switching device such as the FET Q4 is inserted between the battery 13 and the charging circuit 14, so that both of a charging to and discharging from the battery may pass the switching device. It should be noted that other bidirectional switching device other than FETs may be employed in the present embodiment.

In this embodiment, as in the preceding embodiments, the current through the zener diode D4 and the resister R5 disappears when the output voltage of the battery 13 is decreased beyond the predetermined level, and the control transistor Q2 and the power transistor Q1 become turned off to prevent an excessive discharge of the battery 13. At this time, the dc/dc converter 12 becomes inoperative to cause to turn off the transistors Q7, Q6, Q5, and the FET Q4. The backup secondary battery 13 is completely disconnected from a load circuit including the signal processing circuit 20.

In this situation, there is only a self-discharge in the battery 13 itself, thus overdischarge of the battery 13 can be prevented more effectively. Furthermore, although the battery 13 is installed in the power supply circuit 10 before use of the hub having a power supply circuit 10 of the present embodiment, the battery 13 is consumed only by self-discharge thereof since the battery 13 is completely isolated from the peripheral circuit by the FET Q4 which remains turned off until an ac power is supplied.

It is possible to connect an additional battery to the input terminals of the dc/dc converter 12 in order to extend a backup period even though the terminal voltage of which is different from that of the backup battery 13 by employing a dc/dc converter which tolerates a wide range of input voltage. Meanwhile, since a dc output current of the backup secondary battery is directly supplied to the load circuit due to the dc/dc converter without inverted into an ac current, a time lag prior to backup operation can be reduced.

It should be understood that the invention is not limited to the particular embodiments shown and described herein, but that various changes and modifications may be made without departing from the spirit and scope of the invention as defined by the following claims.

What is claimed is:

1. A hub for a local area network, including a plurality of communication ports connected to each of nodes in said network, through which a signal is transmitted among said nodes, a signal processing circuit having at least the functions of repeating said signal transmitted among the nodes and reshaping a waveform thereof, and a power supply circuit for supplying a dc current for driving said signal processing circuit, said power supply circuit comprising: an ac/dc converter for converting an ac current applied from an external ac power supply without passing through a power switch thereto into a predetermined dc current and supplying the dc current to a load circuit including said signal processing circuit without passing through a power switch; a backup secondary battery; a charging circuit for trickle-charging said backup secondary battery by said dc current output from said ac/dc converter; and a switching circuit for opening and closing a current path for supplying an output current of said backup secondary battery to said load circuit; said switching circuit including a switching device inserted in the current path between the backup secondary battery and the load circuit and a control circuit for an on-off control of said switching device; said control circuit including a manual switch for turning on said switching device in case that said charging circuit provides an effective output current, whereby said switching device is held at an on state by an output current of said backup secondary battery, said manual switch preventing said switching device from turning on, thereby avoiding undesirable discharge of said backup secondary battery through said switching device, while the power supply circuit is not supplied with an external ac power.

2. A hub for a local area network as set forth in claim 1, wherein said switching device is a power transistor.

3. A hub for a local area network as set forth in claim 1, wherein said switching device is turned off when a terminal voltage of said backup secondary battery drops beyond a predetermined voltage level.

4. A hub for a local area network as set forth in claim 1, further comprising:
   a charging control circuit for connecting said backup secondary battery with said charging circuit when said ac/dc converter outputs the predetermined dc current and the backup secondary battery is installed in said power supply circuit; and a battery condition indicating circuit for outputting a battery condition signal indicating that the backup secondary battery is installed in the power supply circuit to provide a predetermined dc current when the ac/dc converter outputs a predetermined dc current by the ac power supplied to the ac/dc converter.

5. A hub for a local area network as set forth in claim 4, wherein said battery condition signal is transmitted to said signal processing circuit from said battery condition indicating circuit.

6. A hub for a local area network as set forth in claim 4, wherein said charging control circuit includes a bidirectional switching device for connecting the charging circuit to the backup secondary battery and a control circuit for the same.

7. A hub for a local area network as set forth in claim 6, wherein said bidirectional switching device is a field effect transistor.

8. A hub for a local area network as set forth in claim 1, wherein said load circuit includes a backup detecting circuit for detecting that said ac/dc converter does not supply an effective output current and an effective output current is supplied to said load circuit from said backup secondary battery by turning on said switching circuit.

9. A hub for a local area network as set forth in claim 8, wherein said load circuit further includes a buzzer circuit for sounding a buzzer on responding a backup detection signal of said backup detecting circuit.

10. A hub for a local area network as set forth in claim 9, wherein said buzzer circuit comprises a manual cancel switch for stopping buzzing of the buzzer.

11. A hub for a local area network as set forth in claim 1, wherein said signal processing circuit comprises means for transmitting detection of an output signal from the backup detecting circuit through a predetermined communication port to an external circuit.

12. A hub for a local area network, including a plurality of communication ports connected to each of nodes in said network, through which a signal is transmitted among said nodes, a signal processing circuit having at least the functions of repeating said signal transmitted among the nodes and reshaping a waveform thereof, and a power supply circuit for supplying a dc current for driving said signal processing circuit, said power supply circuit comprising: an ac/dc converter for converting an ac current applied from an external ac power supply without passing through a power switch thereto into a predetermined dc current and supplying the dc current to a load circuit including said signal processing circuit without passing through a power switch; a backup secondary battery; a charging circuit for trickle-charging said backup secondary battery by said dc current output from said ac/dc converter; and a switching circuit for opening and closing a current path for supplying an output current of said backup secondary battery to said load circuit; said switching circuit including a switching device inserted in the current path between the backup secondary battery and said load circuit and a control circuit for an on-off control of said switching device; said control circuit turning on said switching device on receiving a link effective signal from said signal processing circuit when said communication port is connected to an active node that communication can be established therebetween, whereby said switching device is held at an on state by an output current of said backup secondary battery, said switching device being maintained turned off while said link effective signal is not received by said control circuit, thereby avoiding undesirable discharge of said backup secondary battery through said switching device.

13. A hub for a local area network as set forth in claim 12, wherein said switching device is a power transistor.

14. A hub for a local area network as set forth in claim 12, wherein said switching device is turned off when a terminal voltage of said backup secondary battery drops beyond a predetermined voltage level.

15. A hub for a local area network as set forth in claim 12, wherein said load circuit includes a backup detecting circuit for detecting that said ac/dc converter does not supply an effective output current and an effective output current is supplied to said load circuit from said backup secondary battery by turning on said switching circuit.

16. A hub for a local area network as set forth in claim 15, wherein said load circuit further includes a buzzer circuit for sounding a buzzer on responding a backup detection signal of said backup detecting circuit.

17. A hub for a local area network as set forth in claim 16, wherein said buzzer circuit comprises a manual cancel switch for stopping buzzing of the buzzer.

18. A hub for a local area network as set forth in claim 12, wherein said signal processing circuit comprises means for transmitting detection of an output signal from the backup detecting circuit through a predetermined communication port to an external circuit.

* * * * *